United States Patent [19]

Atkins et al.

[11] Patent Number: 4,755,557

[45] Date of Patent: Jul. 5, 1988

[54] FIBER REINFORCED MOLDING COMPOSITIONS PROVIDING IMPROVED SURFACE CHARACTERISTICS

[75] Inventors: Kenneth E. Atkins, South Charleston; Raymond C. Gandy, St. Albans, both of W. Va.

[73] Assignee: Union Carbide Corporation, Danbury, Conn.

[21] Appl. No.: 876,212

[22] Filed: Jun. 19, 1986

[51] Int. Cl.$^4$ .............................................. C08L 67/06
[52] U.S. Cl. ........................................ 525/27; 525/43; 525/49; 525/168; 525/170; 524/107; 524/108; 524/110; 524/111
[58] Field of Search .................. 525/170, 168, 27, 49, 525/43; 524/107, 108, 109, 110, 111

[56] References Cited

U.S. PATENT DOCUMENTS

| | | | |
|---|---|---|---|
| 3,718,714 | 2/1973 | Comstock | 260/862 |
| 3,842,142 | 10/1974 | Harpold | 260/862 |
| 4,020,036 | 4/1977 | South, Jr. | 260/40 R |
| 4,032,494 | 6/1977 | Gentry | 260/29.1 SB |
| 4,079,024 | 3/1978 | Hess et al. | 260/16 |
| 4,101,604 | 7/1979 | Rowe | 260/40 R |
| 4,160,759 | 7/1979 | Gardner et al. | 260/40 R |
| 4,161,471 | 7/1979 | Kassal | 260/40 R |
| 4,172,059 | 10/1979 | Atkins et al. | 260/22 CB |
| 4,210,571 | 7/1980 | Herman et al. | 260/40 R |
| 4,210,572 | 7/1980 | Herman et al. | 260/40 R |
| 4,263,199 | 4/1981 | Atkins | 260/40 R |
| 4,284,736 | 8/1981 | Comstock et al. | 525/169 |
| 4,288,571 | 9/1981 | Comstock et al. | 525/170 |
| 4,374,215 | 2/1983 | Atkins | 523/514 |

OTHER PUBLICATIONS

Atkins et al., "Low Profile Additives for Reinforced Polyester", Plastics Compounding, Jan./Feb. 1982.
Atkins, "Low Profile Behavior", Polymer Blends, vol. 2, 1978.

*Primary Examiner*—Patricia A. Short
*Attorney, Agent, or Firm*—Paul W. Leuzzi

[57] ABSTRACT

A molding composition is provided which, through the use of a lactone monomer, improves the surface characteristics of the molded composite. In particular, the use of ε-caprolactone (oxepane-2-one) provides a smoother surface and enhanced dimensional stability.

8 Claims, No Drawings

FIBER REINFORCED MOLDING COMPOSITIONS PROVIDING IMPROVED SURFACE CHARACTERISTICS

BACKGROUND OF THE INVENTION

1. Field

This invention generally relates to fiber-reinforced molding compositions which provide improved surface characteristics to the molding composites formed therefrom. More specifically, the use of lactone monomers in a fiber-reinforced molding composition results in molding composites having an enhanced surface appearance.

2. Prior Art

Unsaturated polyester resins have been used in a variety of fiber reinforced materials. These materials have been fabricated by differing techniques including hand lay-up, spray-up, filament winding, continuous pultrusion, continuous laminating and matched metal-die molding. Recently, the industry has experienced tremendous growth in the use of unsaturated polyester resins in matched metal-die molding applications. This is particularly true for fiber-reinforced, unsaturated polyester resins employed in the automotive industry.

Despite showing considerable utility in matched metal-die molding applications, standard polyester resins exhibited a number of problems. Major among these problems were warpage of molded parts, poor surface appearance, internal cracks and voids and the inability to reproduce the surface contours of the mold.

Over the years a variety of techniques have been employed to overcome these problems. Examples include the use of fillers, various changes in the resin structure and comonomer choice, and partial polymerization of the resin prior to molding the composite, called B-staging.

The solution which has received the greatest acceptance is the use of certain thermoplastics during the formation of the molding composite to compensate for the polymerization shrinkage associated with the curing of the unsaturated polyester resin. During the cure of the unsaturated polyester resin these thermoplastics, referred to as low profile additives, become incompatible with the thermosetting matrix and, under the heat and pressure of the molding operation undergo a thermal expansion which compensates for the polymerization shrinkage.

The development of low profile additives for fiber-reinforced, unsaturated polyester resin molding applications has expanded the acceptance of these molding materials due to their good surface appearance, dimensional stability, physical properties, assembly consolidation and potential weight savings. However, while fiber-reinforced, unsaturated polyester resin molding has penetrated the industry into many applications, the quality demands for a composite so produced has steadily been increasing. This is especially true with respect to the surface characteristics of the composite.

Despite the attempts mentioned above, there continues a need for formulated molding compositions which will provide improved surface characteristics in the molded composite.

OBJECTS OF THE INVENTION

It is a primary objective of the present invention to improve the surface characteristics of composites molded from fiber-reinforced, unsaturated polyester resins.

Another object of the present invention is to provide an improved molding composition based on unsaturated polyester resins which, when used with fiber reinforcements, will improve the surface characteristics of the molded composite.

Another object of the present invention is to ensure that the improved molding composition is compatible with low profile additives so as to avoid the problems associated with standard unsaturated polyester molding compositions.

Further objects of the invention will become apparent from the detailed disclosure and examples which follow.

SUMMARY OF THE INVENTION

The instant invention provides an improved molding composition for use with fiber reinforcements. The molded composites produced with the improved molding compositions exhibit enhanced surface characteristics. These enhanced surface characteristics include a smoother, more uniform surface appearance as well as the reduction and/or elimination of ripples and waves in the surface.

The improved molding composition comprises an unsaturated polyester resin, an ethylenically unsaturated monomer copolymerizable with said polyester resin, a thermoplastic low profile additive, and a lactone monomer. It has unexpectedly been found that utilizing from about 2 to about 20 parts per hundred parts, of a lactone monomer based on the combined weight of the unsaturated polyester resin, the ethylinically unsaturated monomer and the low profile additive, in the molding composition greatly improves the surface charactericstics of the resulting molded composite.

DETAILED DESCRIPTION OF THE INVENTION

In accordance with the present invention there is provided a novel molding composition comprising an unsaturated polyester resin, an ethylinically unsaturated monomer copolymerizable with said polyester resin, a thermoplastic low profile additive and a lactone monomer.

Suitable unsaturated polyester resins are a family of products based on the condensation of unsaturated and saturated dicarboxylic acids or their anhydrides with various polyols. Generally, these resins have an average molecular weight on the order of 500 to about 10,000, preferably 1,000 to above 6,000 provided those preferred above 6,000 have an acid number less than 100.

Illustrative of suitable unsaturated polycarboxylic acids which are condensed with the polyols to produce the unsaturated polyesters of this invention are those having the formula:

Formula I

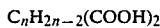

wherein n is an integer having a value of 2 to 20 inclusive, preferably 2 to 10 inclusive. Among such suitable acids are fumaric acid, maleic acid, glutaconic acid, citraconic acid, itaconic acid, ethidenemalonic acid, mesaconic acid, allylmalonic acid, propylidenemalonic acids, hydromuconic acid, pyrocinchonic acid, allyl succinic acid, carbocaprolactonic acid, teraconic acid, xeronic acids, etylmalonic acid and other like ethylenically unsaturated acids. The fumaric and maleic acids are especially preferred.

Other suitable unsaturated acids include 4-amyl-2,5-heptaldienedioic acid, 3-hexynedioic acid, tetrahydrophthalic acid, 3-carboxy cinnamic acid and the like.

If desired, the acid anhydrides of the acids previously described can be used by themselves or in admixture with the above acids to produce the unsaturated polyesters of this invention.

In addition to the anhydrides of the acids noted above, the following acid anhydrides can also be used: pentenyl succinic anhydride, octenyl succinic anhydride, nonenyl succinic anhydride, chloromaleic anhydride, dichloromaleic anhydride, hexachloroendomethylene tetrahydrophthalic anhydride, commonly referred to as chlorendic anhydride, the Diels-Alder adducts of maleic acid and alicyclic compounds having conjugated double bonds such as methylbicyclo-[2,2,1]-hepten-2,3-dicarboxylic anhydride and the like.

If desired, aromatic polycarboxylic acids, saturated polycarboxylic acids, anhydrides thereof or monocarxylic acids can also be used in conjunction with the unsaturated polycarboxylic acids or the anhydrides thereof, to produce the unsaturated polyesters.

Illustrative of saturated polycarboxylic or aromatic polycarboxylic acids include, among others, phthalic acid, hexahydrophthalic acid, tetrachlorophthalic acid, succinic acid, adipic acid, suberic acid, azalaic acid, sebacic acid, dimethyl succinic acid and the like as well as derivatives thereof, e.g., chlorinated derivatives.

Among suitable monocarboxylic acids, which usually contain a maximum of twenty-two carbon atoms, are benzoic acid, hexanoic acid, caprylic acid, lauric acid, caproic acid, myristic acid, palmitic acid, stearic acid, arachidic acids, palmitoleic acid, oleic acid, linoleic acid, linolenic acid, eleostearic acid, licanic acid, ricinoleic acid, hexenoic acid, hexadienoic acid, octenoic acid, and the like. It is advantageous for purposes of economy to employ mixtures of acids, particularly those derived from natural sources such as castor oil, dehydrated caster oil, coconut oil, cottonseed oil, linseed oil, oiticica oil, perilla oil, olive oil, safflower oil, sardine oil, soybean oil, tall oil, tung oil (China wood oil), and the like.

Illustrative of suitable polyols for purposes of this invention are the dihydric alcohols having the formula:

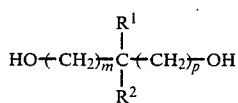

Formula II wherein the sum of m+p is at least 1, preferably 1 to 20 inclusive and $R^1$ and $R^2$, which can be the same or different, are hydrogen or alkyl and when alkyl, containing 1 to 20 carbon atoms inclusive. Specific compounds include, among others, ethylene glycol, propylene glycol, butanediol-1,2, butanediol-1,3, butanediol-1,4, hexanediol-1,6, decanediol-1,10, neopentyl glycol and the like.

Also suitable are the ether diols having the general formula:

Formula III

wherein a has a value of at least 1, preferably 2 to 6 inclusive, and x has a value of at least 2, preferably 2 to 10 inclusive. Among compounds falling within the scope of this formula are diethylene glycol, dipropylene glycol triethylene glycol, tetraethylene glycol, and the like.

Other suitable polyols are the tetrahydric compounds such as pentaerythritol, dipentaerythritol, diglycerol, pentaglycerol, polyvinyl alcohol and the like.

As a rule, not more than 20 mole percent of the polyol should be triol, with the remainder being one or more diols.

Preparation of unsaturated polyesters can be carried out by methods well known in the art. As a rule, the condensation reaction is conducted by reacting a mixture containing an unsaturated polycarboxylic acid and a polyol, in an amount of about 2 to about 15 percent in molar excess with respect to the polycarboxylic acid, at temperatures on the order of about 160° C. to about 250° C., preferably about 175° C. to about 225° C., to polyesters having an acid number of less than about 100, generally about 10 to about 60, preferably about 25 to about 50.

Illustrative of suitable polymerizable, ethylenically unsaturated monomers are the vinyl monomers having the formula:

Formula IV

wherein R is a group having an unsaturated carbon-to-carbon, carbon-to-oxygen, or carbon-to-nitrogen group in conjugation with the vinyl group. Groups having such unsaturation in conjugation with the vinyl group are aryl, ketonic, heterocyclic, nitrile, carbalkoxy, carboxy and amido.

Specific vinyl monomers include the following:

Wherein R is aryl: styrene, halogenated sytrenes such as chlorostyrene, p-iodostyrene, m-fluorostyrene, dichlorostyrene and the like; alkyl substituted styrenes such as p-methyl styrene, p-ethyl-styrene, o-tert-butyl styrene and the like; alkoxy and aryloxy substituted styrenes such as p-ethoxy styrene, p-propoxy styrene, p-phenoxy styrene and the like;

wherein R is ketonic: ethyl vinyl ketone, n-propyl vinyl ketone, phenyl vinyl ketone and the like;

wherein R is heterocyclic is heterocyclic: vinyl pyridine, vinyl quinoline, vinyl pyrrole, vinyl carbazole, vinyl thiophene and the like;

wherein R is nitrile; acrylonitrile and the like;

wherein R is amido; acrylamide, bicycloheptylacrylamide, diacetoneacrylamide and the like;

wherein R is carboxy: acrylic acid and the like;

wherein R is carbalkoxy: methyl acrylate, butyl acrylate, octyl acrylate, lauryl acrylate, cyclohexyl acrylate, phenyl acrylate, benzyl acrylate and the like.

Also suitable is diallylphthalate and the like. However, styrene and styrene derivatives are preferred.

The amount of ethylenically unsaturated monomer used can vary over wide limits. For example, the monomer can be used in amounts of about 10 to about 60 percent by weight based on the combined weight of the monomer and the unsaturated polyester. It is preferred to use about 20 to about 50 percent by weight ethylenically unsaturated monomer, based on the combined weight of the monomer and unsaturated polyester.

Suitable thermoplastic low profile additives may include poly(vinyl acetates), poly(methyl methacrylate) and copolymers thereof with other acrylates, vinyl chloride-vinyl acetate copolymers, polystyrene and various styrene-containing copolymers, polyethylene, polyurethanes, polycaprolactones, cellulose acetate butyrate, and a variety of saturated polyesters and blends of saturated polyesters with poly(vinyl chloride). Normally, the low profile additive is present in the molding composition in an amount ranging from 7 to 20 wt %. Preferably, the low profile additive is a poly(vinyl acetate).

The lactone monomer may be represented by

where R is either a divalent hydrocabon group containing from two to twelve carbon atoms or an ester-containing group having from two to twenty carbon atoms.

Illustrative of such lactones are beta-priopiolactone (oxetane-2-one) and its alpha- and beta-substituted derivatives; gamma-butylrolactone (oxolane-2-one), ethylene carbonate (1,3-dioxolane-2-one) and their simple alkyl and benzo derivatives δ-valeralactone (oxane-2-one); 1,4-dioxane-2-one; 1,4-thioxane-3-one; ethylene oxalate (1,4-dioxane-2,3-dione); trimethylene carbonate (1,3-dioxane-2-one); and ε-caprolactone (oxepane-2-one). It is preferred that ε-caprolactone (oxepane-2-one) be utilized.

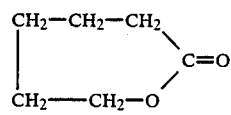

In formulating the compositions of this invention which are to be used in molding applications such as sheet molding, premix and preform, it is customary to add the following additional materials:

(1) a peroxide which serves to accelerate the cross-linking reaction, (2) a thickening agent which serves to provide body to the compositions by increasing the viscosity of the polyesters although it should be noted that one aspect of the invention is the ability to mold composites without the use of such thickening agents, (3) fillers, including fillers which serve as reinforcing agents, and (4) mold release agents.

Among suitable peroxides that can be used are those which function as free-radical polymerization initiators. Examples of such peroxides are the hydroperoxides such as tert-butyl hydroperoxide, cumene hydroperoxide, paramenthane hydroperoxide and the like; peroxy esters such as di-tert-butyl diperoxyphthalate, tert-butyl peroxyacetate and the like; alkyl peroxides such as di-tert-butyl peroxide, dibenzyl peroxide and the like; ketone peroxides such as methyl ethyl ketone peroxide, cyclohexanone peroxide and the like; acyl peroxides such as benzyl peroxide, parachlorobenzoyl peroxide, 2,4-dichlorobenzoyl peroxide, lauroyl peroxide and the like.

The amount of peroxide used is sufficient to effect a cross-linking or thermosetting of the composition in a relatively short period of time. As a rule the amount used is about 0.1 to about 5 percent and preferably about 0.5 to about 2 percent by weight based on the weight of the unsaturated polyester, styrene and termoplastic low profile additive.

Among suitable thickening agents are the oxides and hydroxides of metals of Groups I, II and IV of the Periodic Table (Handbook of Chemistry and Physics, 50th edition). Illustrative of specific oxides and hydroxides of the metals noted are the following: magnesium oxide, calcium oxide, zinc oxide, barium oxide, magnesium hydroxide, calcium hydroxide, and the like. In addition, isocyanate based compounds can also be employed as thickening agents either alone or in combination with the oxides or hydroxides.

The thickening agents are used in amounts of about 0.5 to about 75 and preferably in amounts of about 1 to about 5 percent by weight based on the weight of the unsaturated polyester.

Fillers which are commonly employed in polyester compositions include, among others, glass fibers, clay, calcium carbonate, silica, hydrated alumina and the like. These materials are generally used in amounts of about 20 to about 80 percent by weight based on the weight of the polyester resin.

Reinforcing fillers such as glass fibers or fabrics, asbestos fibers or fabrics, various organic fibers or fabrics such as those made of polypropylene, acrylonitrile/vinyl chloride copolymer, and others known to the art are particularly useful.

Mold release agents or lubricants, such as zinc stearate, calcium stearate, and others known to the art are suitable.

The compositions of this invention can be prepared by mixing the components in a suitable apparatus such as a Cowles dissolver, at temperatures on the order of about 23° C. to about 50° C.

Once formulated, the compositions can be formed into sheets using any suitable apparatus and thereafter molded into thermoset articles of desired shape, particularly thermoset articles such as automobile fenders, dash-boards, hoods, deck lids, and the like. The actual molding cycle will, of course, depend upon the exact composition being molded. Suitable molding cycles are conducted at temperatures on the order of about 100° C. to about 182° C. for periods of time ranging from about 0.5 minute to about 5 minutes.

There are three major compounding techniques for match metal-die molding; these are briefly described below, and more detailed descriptions are given by Gaylord, "Reinforced Plastics—Theory and Practice", 2nd Edition, Cahners Publications, 1974. Examples of typical formulations and the wide strength properties available from these techniques are given in Tables I and II.

TABLE I

| Typical Formulations for Compression Molding | | | |
|---|---|---|---|
|  | BMC | SMC | Preform |
| Resin (pbw)[a] | 100 | 100 | 100 |
| Filler (pbw) | 200–250 | 100–200 | 75 |
| Catalyst (pbw) | 1.0–1.5 | 1.0–1.5 | 0.75–1.5 |
| Mold release (pbw) | 2.0–4.0 | 2.0–4.0 | 0.75–4.0 |
| Thickening agent | 0.5–4.0 (optional) | 0.5–4.0 | — |
| Glass fiber (wt %) | 10–25 | 20–30 | 20–35 |
| Fiber length (in.) | ⅛–½ | 1 | 1–2 |

[a]Pbw = parts by weight

TABLE II

Typical Strengths for Compression Molding SMC

|  | BMC | SMC | Preform |
|---|---|---|---|
| Izod Impact, notched (ft-lb/in) | 5 | 15 | 18 |
| Tensile strength (psi) | 5000 | 12000 | 15000 |
| Flexural strength (psi) | 15000 | 25000 | 30000 |
| Flexural modulus (psi × $10^6$) | 1.2 | 1.7 | 1.8 |
| Glass content (wt. %) | 15 | 30 | 30 | a. Sheet Molding Compounds (SMC)

Sheet molding compound (SMC) is produced on a machine onto which a mixture of resin, fillers, mold-release agent, catalyst, and thickening agent are doctored. Two layers of this mixture are used to sandwich chopped glass strand (about 1-in. lengths) between two polyethylene sheets. The thickening agent (e.g., MgO) reacts with carboxyl groups in the resin to increase viscosity to 10–80,000,000 cp. This high viscosity allows for good glass fiber distribution throughout a large part during mold flow.

b. Premix or Bulk Molding Compound (BMC)

These compounds comprise resin, filler, catalyst, mold-release agents, and short reinforcing fibers (⅛-½ in.) simply blended together in an appropriate mixer. Sometimes chemical thickening agents are added to these mixes. These compounds are usually employed to produce relatively small, complex parts.

c. Preform or "Wet" Compounds

In this technique chopped glass fiber (1, 2-in lengths) are preformed into the shape of the article to be molded and bound by cure of a small amount of polyester resin added as the glass is applied to the performing mold. A mixture of resin system, filler, catalyst, and mold-release agent is poured over the glass preform at the molding press and the composite compression molded. This technique is used to produce large, relatively simple parts, in which uniform strength distribution is most critical.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

DEFINITION OF MATERIALS

Resin A. An unsaturated polyester resin from Freeman Chemical Company designated 3906 which is a high reactivity isophthalic acid modified resin containing approximately 35 weight percent of styrene monomer.

Resin B. A highly reactive unsaturated polyester resin believed to be ortho-phthalic anhydride modified containing approximately 38 weight percent of styrene sold by USS Chemicals Polyester Unit as USS-13047A.

Resin C-Flexible, reactive polyester resin by Koppers Co. as B-363-66.

Low Profile Additive A. A product of Union Carbide Corporation which is a copolymer of vinyl acetate and acrylic acid (40 weight percent) dissolved in styrene (80 weight percent) designated LP-40A.

Low Profile Additive B. A 40 weight percent solution of poly(vinyl acetate) in styrene sold by the Union Carbide Corporation under the designation LP-85.

Low Profile Additive C. Modified poly(vinyl acetate)/styrene solution sold by Union Carbide Corporation as Neulon ® Polyester Modifier T.

Low Profile Additive D. A 40 weight percent solution in styrene of non-carboxylated poly(vinyl acetate) polymer sold by Union Carbide called LP-90.

Low Profile Additive E. A 35 weight percent solution in styrene of a proprietary rubber modified polystyrene sold by Union Carbide called LP-80.

TBPB. Tert-butylperbenzoate.

PBQ. Parabenzoquinone.

PDO. A 50% dispersion of tert-butylperoctoate in dioctyl phthalate sold by the Lucidol Division of Penwalt Corp.

FA-A. A mixture of commercial fatty acids sold by Union Carbide Corporation under the designation VR-3.

Filler A. A sized fiberglass reinforcement of ¼" length sold by Johns Manville Corp. designated JM 308A.

Filler B. A carbon black pigment dispersion provided by Plasticolors, Inc. called CM-2015.

Filler C-A fiberglass roving chopped to desired length on the sheet molding compound machine and sold by Owens Corning Fiberglass Corp. called OCF-951.

Filler D. A black pigment dispersion sold by Pigment Dispersions, Inc. called PDI-1803.

Filler E. A calcium carbonate sold by Georgia Marble as Calwhite II.

Thickener A. A 33 weight percent dispersion of magnesium oxide in an unsaturated polyester carrier vehicle sold by USS Chemicals/Polyester Unit.

Vehicle A. A polyester vehicle for supplying thickening agents from USS Chemicals called USS-17089.

Caprolactone Monomer. ε-caprolactone (oxepane-2-one).

EXPERIMENTAL SECTION

General Procedure for Preparation of Bulk Molding Compound (BMC) Formulations

All the liquid components (i.e., resin, low profile additive, catalyst, caprolactone, etc.) were weighed individually into a Hobart mixing pan placed on a Toledo balance. The pan was attached to a Model C-100 Hobart mixer (in a hood). The agitator was started at slow speed, then increased to medium speed to completely mix the liquids over a period of 3–5 minutes. The agitator was then stopped and the internal mold release agent (zinc stearate, fatty acid or both) was next added to the liquid from an ice cream carton. The Hobart mixer was restarted and the mold release agent mixed with the liquid until it was completely wet out. The filler was next added to the pan contents (agitator off) then mixed, using medium to high speed, until a consistent paste was obtained. The mixer was against stopped and the weighed amount of thickening agent was mixed into the paste over a period of 2–3 minutes, the mixer was again stopped and ~175 grams of the paste were removed from the pan (using a large spatula) and transferred to a wide mouthed 4 oz. bottle. This paste sample was stored in the capped bottle at room temperature and the viscosity was measured periodically using a Model HBT 5X Brookfield Synchro-Lectric Viscometer on a Helipath Stand.

After removal of the paste sample, the contents were reweighed and styrene loss made up, the chopped glass fibers were added slowly (from an ice cream carton) to the pan with the mixer running on slow speed. The mixer was run for ~30 seconds after all the glass was in the paste. This short time gave glass wet out without glass degradation. The pan was then removed from the mixer and separate portions of the BMC mix for ~450 grams each were removed using spatulas and transferred to aluminum foil lying on a balance pan (balance in the hood). The mix was tightly wrapped in the aluminum foil (to prevent loss of styrene via evaporation) and stored at room temperature until the viscosity of the retained paste sample reached molding viscosity. The weight of the BMC added to the foil varies with the molding application.

General Procedure for Preparation of Sheet Molding Compound (SMC) Formulations

All the liquid components were weighed individually into a 5 gallon open top container placed on a Toledo balance. The contents of the container were then mixed (in a hood) with a high speed Cowless type dissolver. The agitator was started at a slow speed, then increased to medium speed to completely mix the liquids over a period of 2-3 minutes. The mold release agent, if one is desired, was next added to the liquids from an ice cream carton and mixed until completely dispersed. The filler was next added gradually from a tared container until a consistent paste was obtained and the contents were then further mixed to a minimum temperature of 90° F. The thickener was next mixed into the paste over a period of 2-3 minutes, the mixer was stopped and ~175 grams of the paste was removed from the container and transferred to a wide-mouthed 4 oz. bottle. The paste sample was stored in the capped bottle at room temperature and the viscosity measured periodically using a Model HBT 5X Brookfield Synchro-lectric Viscometer on a Helipath Stand.

The balance of the paste is next added to the doctor boxes on the SMC machine where it is further combined with fiber glass (~1" fibers). The sheet molding compound (SMC) is then allowed to mature to molding viscosity and then molded into the desired article.

MOLDING FACILITIES

12"×12"×⅛" Test Panels

Flat panels for MCR surface evaluation are molded on a 75 TON Queens Hydraulic press. The press contains a matched dye set of 2"×12" chrome plated molds. The female cavity is installed in the bottom and the male portion is at the top. Both molds are electrically heated and are controlled on separate circuits so that the molds can be operated at different temperatures. For this molding the top and bottom temperature was 300° F. The molding pressure which can be varied from 0-75 TON was run at maximum pressure. The molds do not contain ejector pins; therefore, the molded panel is removed with a rubber suction cup and the use of a stream of air. The panels are laid on a flat surface, weighted to keep them flat and allowed to cool overnight. The molded panel is measured with a micro caliper from corner to corner in all four directions to determine shrinkage which is an average of the four readings. These panels are also used for surface smoothness determinations with the Bendix Profilometer.

HOOD SCOOPS

Hood Scoops designed like miniature automobile hoods and containing a number of ribs and bosses of varying sizes was used to determine "sink", surface smoothness and overall moldability of sheet molding compound formulations containing surface improvers. The hood scoop contains a large triangular boss (~1.9" base ~3.8" high) and 3 circular bosses (~0.4", ~0.9", ~1.4" diameter). It also contains a number of ribs of varying thickness and with different lead in radii.

Visual observations of these hood scoops as molded and after painting with a gloss black paint enables one to compare "sink" over the ribs and bosses, craze cracking, surface smoothness, glass pattern, laking and overall moldability. The hood scoop mold is installed in a 200 Ton Lawton hydraulic press. The molds contain ejector pins for release of the molded part and are heated with circulating oil. The male core is installed in the bottom of the press and the female cavity at the top. Temperatures of the two molds are controlled separately. Pressure of the press can be varied up to 200 Ton with variable time cycles so that the same part can be molded at several pressures. The speed at which the press closes can also be varied as well as the cure cycle for the molded part. All of these were varied during the molding of SMC formulations containing the surface improvers. Placement of the change pattern on the male core mold was also varied. The molded hoop scoop was allowed to cool and was then evaluated.

The molding viscosities were measured on paste samples containing all of the ingredients except the fiberglass using a Brookfield HBT 5X Viscometer TF spindle at 5 rpm.

The shrinkage data molding conditions for making 12"×12"×⅛" plaques were two minutes at 148° C. and 800 psi unless otherwise specified.

METHOD OF SHRINKAGE MEASUREMENT

A 12"×12"×⅛" flat panel is molded in a highly polished chrome plated matched metal die mold in a 75 TON Queens Hydralic press. The exact dimensions of the four sides of this mold are measured to the ten thousandths of an inch at room temperature. The exact length of the four sides of the flat molded panel is also determined to the ten thousandths of an inch. These measurements are substituted into the equation below:

$(a-b)/a =$ inch/inch shrinkage inch/inch shrinkage $\times 1000 =$ mils/inch shrinkage.

$a =$ the sum of the lengths of the four sides of the mold.

$b =$ the sum of the lengths of the four sides of the molded panel.

TABLE I

| | BMC MIXES | | | | |
| --- | --- | --- | --- | --- | --- |
| | | Example | | | |
| | A | 1 | 2 | 3 | 4 |
| Component | | | | | |
| Resin B | 65 | → | → | → | → |
| LPA-A | 35 | → | → | → | → |
| Caprolactone Monomer | — | 2 | 4 | 8 | 12 |
| Filler E (Adjusted per 100 phr resin) | 175 | → | → | → | → |
| Zinc Stearate | 2 | → | → | → | → |

TABLE I-continued

| | BMC MIXES | | | | |
|---|---|---|---|---|---|
| | Example | | | | |
| | A | 1 | 2 | 3 | 4 |
| FA-A | 2 | → | → | → | → |
| TBPB | 1.5 | → | → | → | → |
| Thickener A | 2.7 | → | → | 3.0 | → |
| Filler A | 10% by weight | → | → | → | → |
| Izod: ft-lbs/inch | 4.43 | | 3.43 | | |
| Molding Viscosity: | | | | | |
| HBT-5X/TF/5 rpm, MM cps | 23.2 | 13.6 | 20.0 | 20.8 | 19.6 |
| Shrinkage: | | | | | |
| mils/inch | 0.0 | +0.17 | +0.21 | +0.30 | +0.48 |
| Surface: | | | | | |

Upon visual examination, the surface of Example 3 was the smoothest and Comparative A was the worst. Example 2 was better than Example 1 which in turn was smoother than Example 4.

+: denotes an actual expansion of the size of the molded part at room temperature compared to the size of the mold at room temperature.

TABLE II

| | BMC MIXES | | | |
|---|---|---|---|---|
| | Example | | | |
| | B | 5 | 6 | 7 |
| Component | | | | |
| Resin A | 60 | → | → | → |
| PBQ | 100 ppm | → | → | → |
| LPA-E | 40 | | | |
| Caprolactone Monomer | — | 2 | 4 | 10 |
| TBPB | 1.5 | → | → | → |
| Calcium Stearate | 4.0 | → | → | → |
| Filler E (Adjusted per 100 phr resin) | 160 | → | → | → |
| Filler D | 7.0 | 7.0 | 7.0 | 7.5 |
| Thickener A | 3.0 | 3.0 | 3.0 | 3.25 |
| Filler A | 20% by weight | → | → | → |
| Molding Viscosity: | | | | |
| HBT-5X/TF/5, MM cps | 12.0 | 12.0 | 11.6 | 11.5 |
| Shrinkage: | | | | |
| mils/inch | 0.95 | 0.80 | 0.75 | 0.40 |
| Surface: | | | | |
| Pigmentation | All essentially identical | | | |
| Smoothness | Difficult to assess any differences | | | |

TABLE III

| | SMC PREPARATIONS | | | | | |
|---|---|---|---|---|---|---|
| | Example | | | | | |
| | 8 | 9 | C | 10 | 11 | D |
| Component | | | | | | |
| Resin C | 58 | 58 | — | — | — | 58 |
| Resin B | — | — | 60 | 60 | 60 | — |
| LPA-A | 39 | — | 40 | 40 | — | — |
| LPA-C | — | 42 | — | — | 40 | 42 |
| Caprolactone Monomer | 3 | 2 | — | 3 | 3 | — |
| Filler E | 175 | 175 | 175 | 175 | 175 | 175 |
| TBPB | 1.7 | 1.7 | 1.7 | 1.7 | 1.7 | 1.7 |
| FA-A | 2.0 | 2.0 | 2.0 | 2.0 | 2.0 | 2.0 |
| Zinc Stearate | 2.0 | 2.0 | 2.0 | 2.0 | 2.0 | 2.0 |
| H₂O %, Adjusted | 0.17 | 0.17 | 0.18 | 0.18 | 0.18 | 0.17 |
| CaO | 1.0 | 1.0 | 1.1 | 1.1 | 1.1 | 1.0 |
| Filler C 2" Glass | 25.5 | 26.3 | 26.5 | 28.5 | 28.6 | 26 |
| Shrinkage, mils/inch | +1.02 | +1.08 | +0.13 | +0.48 | +0.96 | — |
| H₂O Absorption, % Increase | | | | | | |
| @ 350 g panel | +0.61 | +0.55 | +0.38 | +0.51 | +0.50 | — |
| @ 450 g panel | +0.52 | +0.39 | +0.35 | +0.43 | +0.43 | |

Comparison of the surface smoothness of Example D with Examples 8 and 9 showed the latter to be smoother in appearance. The improved shrinkage control of Examples 10 and 11 over Example C likewise illustrated the effectiveness of the present invention.

In-mold coating and painting of the panels made from the invention similarly showed improvements in surface smoothness. The coating adhesion of such panels are measured by conventional crosshatch cuts and taping was considered excellent.

TABLE IV

| | SMC FORMULATION | | | | | |
|---|---|---|---|---|---|---|
| | Example | | | | | |
| | E | F | G | 12 | 13 | 14 |
| Component | | | | | | |
| Resin B | 65 | → | → | → | → | → |
| LPA-A | — | — | 33.3 | — | — | 33.2 |
| LPA-E | 37 | — | — | 37 | — | — |
| LPA-C | — | 37 | — | — | 37 | — |
| Vinyl Acetate | — | — | — | — | — | 1.2 |
| Caprolactone Monomer | — | — | — | 2.0 | 2.0 | 2.5 |
| FA-A | 1.5 | → | → | → | → | → |
| Zinc Stearate | 1.0 | → | → | → | → | → |
| TBPB | 1.0 | → | → | → | → | → |
| PDO, 50% | 0.5 | → | → | → | → | → |
| H₂O %, Adjusted to | 0.19 | → | → | → | → | → |
| Filler E | 170 | → | → | → | → | → |
| B-Side | 26.3 | → | → | → | → | → |
| Thickener B | 20.0 | | | | | |
| % LPA-B | 20.0 | | | | | |
| % Filler E | 51.2 | → | → | → | → | → |
| % Filler D | 1.4 | | | | | |
| % Zinc Stearate | 2.0 | | | | | |
| % CaO | 5.4 | | | | | |
| Filler D, 1" Glass | 24.8 | 24.2 | 24.4 | 24.2 | 24.3 | 24.5 |
| Molding Viscosity: | | | | | | |
| HBT-5X/TF/5 rpm, MM cps | 12.0 | 13.2 | 12.4 | 13.2 | 16.0 | 14.4 |

TABLE V

| COMPATIBILITY STUDIES OF CAPROLACTONE MONOMER IN LPA-A and LPA-C | | | | |
|---|---|---|---|---|
| Ingredients | | | | |
| LPA-A | 93 | 90 | — | — |
| LPA-C | — | — | 93 | 90 |
| Caprolactone Monomer | 7 | 10 | 7 | 10 |
| Viscosity Data, cps | | | | |
| 3 Days; LVT/#4/60 rpm | 3850 | 3000 | 2250 | 2150 |
| 11 Days | 3650 | 3350 | 2460 | 2160 |
| Acid No. | | | | |
| 11 Days | 2.84 | 2.90 | 2.46 | 2.46 |
| Solubility Characteristics: | | | | |
| 17 Days | Completely Miscible → | | | |

We claim:
1. A molding composition comprising an unsaturated polyester resin, an ethylenically unsaturated monomer copolymerizable with said polyester resin, a thermoplastic low profile additive wherein the improvement consists of said composition containing from 2 to 20 parts of a lactone monomer per hundred parts of the combined weight of the unsaturated polyester resin, ethylenically unsaturated monomer and thermoplastic low profile additive and wherein the lactone monomer is represented by the formula:

wherein R is either a divalent hydrocarbon group containing from 2 to 12 carbon atoms inclusive or an ester-containing group having from 2 to 20 carbon atoms inclusive.

2. The molding composition of claim 1 wherein the lactone monomer is $\epsilon$-caprolactone (oxepane-2-one).

3. The molding composition of claim 1 wherein the ethylenically unsaturated monomer is styrene or a styrene derivative.

4. The molding composition of claim 1 wherein the thermoplastic low profile additive is poly(vinyl acetate).

5. The molding composition of claim 1 wherein a peroxide is also employed.

6. The molding composition of claim 1 wherein a mold release agent is also employed.

7. The molding composition of claim 1 wherein a filler is also employed.

8. The molding composition of claim 1 wherein a thickening agent is also employed.

* * * * *